United States Patent [19]
Lambrecth

[11] 3,909,931
[45] Oct. 7, 1975

[54] METHOD FOR SECURING WINDING BARS IN SLOTS OF ELECTRIC GENERATORS

[75] Inventor: Dietrich Lambrecth, Mulheim (Ruhr), Germany

[73] Assignee: Kraftwerk Union Aktiengesellschaft, Mulheim (Ruhr), Germany

[22] Filed: May 23, 1974

[21] Appl. No.: 472,642

Related U.S. Application Data

[63] Continuation of Ser. No. 319,311, Dec. 29, 1972, abandoned.

[52] U.S. Cl. ..................... 29/596; 29/446; 310/214
[51] Int. Cl.² .......................................... H02K 15/06
[58] Field of Search ........ 29/596, 598, 446; 310/42, 310/214, 215

[56] References Cited
UNITED STATES PATENTS

| | | | |
|---|---|---|---|
| 2,922,058 | 1/1960 | Bacon | 310/214 |
| 3,009,073 | 11/1961 | Drabik et al. | 310/214 |
| 3,243,622 | 3/1966 | Whittlesey | 310/214 |
| 3,444,407 | 5/1969 | Yates | 310/215 |
| 3,780,325 | 12/1973 | Frankenhauser | 310/214 |

*Primary Examiner*—Carl E. Hall
*Attorney, Agent, or Firm*—Herbert L. Lerner

[57] ABSTRACT

Means to secure winding bars in slots of electric machines. A spring is mounted under a wedge in the slot. The spring is in the form of a corrugated leaf spring corrugated in a direction so that the corrugations extend transversely of the longitudinal length of the leaf spring. The spring has a spring characteristic selected such that the spring, when installed in the slot, can be compressed at least 80% of its expanded state, and the spring pressure or biasing force is always higher than the total pulsating or changing bar pressure.

1 Claim, 3 Drawing Figures

METHOD FOR SECURING WINDING BARS IN SLOTS OF ELECTRIC GENERATORS

This is a continuation, of application Ser. No. 319,311, filed Dec. 29, 1972 now abandoned.

With increasing unit ratings of dynamoelectric machines and the bar current ratings which increase accordingly, the problem of the bar forces resulting therefrom, which have a pulsating effect on the bottom of the slot, become more important because such forces increase as the square of the bar currents. The bar assembly and the insulation are therefore subjected to continuous, repetitive compression stresses which tend to have a destructive effect on the bars, even in spite of good wedging, and the insulation if no provisions are made to prevent the play which occurs due to settling of the insulation parts.

If play occurs between the winding bars and the slot-closing wedge, in the course of operation, the bar vibrates in the empty space defined by the play. This causes the bars to strike on and against their base, whereby the vibration forces acting on the insulation can be many times the pulsating electromagnetic bar force. In water-cooled windings, these forces may not only destroy the insulation but may also cause cracks in the hollow subconductors which in turn may lead to leaks and, through the action of the moisture, to ground and winding shorts. The result would be the destruction of the stator winding or even of the stator lamination stack.

In this connection several arrangements have become known which provide for a securing the bars in the slot. From German published non-prosecuted patent application No. 1,463,872, for example, a device is known for securing electric conductors in which springs are inserted between the slot-closing wedge and the upper bar and the springs can be re-tightened by means of turnkeys in the wedge. Such a device, however, is very expensive, weakens the slot-closing wedge, and permits re-tightening only with the machine standing still and the rotor removed so that loosening of bars during operation cannot be avoided. The necessary removal of the rotor means that the turbo generator would have to be taken out of service for several weeks to tighten the springs. If the spring breaks, moreover, long sections of the bar are no longer held down sufficiently, so that damage can be caused thereby and in addition, the entire spring must be replaced. From Swiss Pat. No. 393,505 a locking device is furthermore known in which an elastic tube is disposed above or between the bars. The elastic tube is under gas or liquid pressure and functions to lock the bars in this manner. This type of locking device is also very expensive and involves a great deal of risk. For example, in the event of a break in the elastic tube, a sudden drop in the pre-tensioning force would occur which would require immediate stopping of the turbogenerator in order to prevent the destruction of the winding.

In contrast to the above, it is an object of the present invention to provide a device for securing winding bars in which sufficient securement of the winding bars is assured over very long periods of operation under any operating conditions and even when the bars settle. The present invention includes a device in which there is at least one bar in each slot, and a slot-closing wedge is disposed in the vicinity of the slot opening as well as at least one tension spring extends in the longitudinal direction of the slot.

The present invention comprises a spring in the form of a leaf spring which is corrugated along its longitudinal length. The spring has a spring characteristic which is as linear as possible over up to at least 70% of its maximum spring excursion or expanded state. The spring, when installed in the slot, is compressed at least 80% of its spring excursion or expanded state and the spring pressure produced thereby is higher than the total pulsating or varying bar pressure. This arrangement assures that with such a spring, the bars in the slot are continuously subjected to sufficient pretension and the detrimental effects hereinabove described in connection with known prior art devices cannot occur. According to the present invention, the spring is compressed at least 80% of its natural state and therefore initially lies in the slot so that it is almost compressed flat. Should the spring break during operation, the effect or applied biasing force is not lost, because the spring is not movable in an axial direction. Moreover, however, almost the entire spring expansion is available in this manner for maintaining a permanent, sufficiently high pretension, even if settling occurs, and for preventing radial play of the bars in the slot, especially lifting of the bars from the bottom of the slot.

For producing the required spring force with the largest possible spring expansion and a spring characteristic as linear as possible, it is preferred that the spring consists of resin-impregnated and hardened, unidirectional fiber-glass cloth and that it has spring strands which are about 15 times heavier in the direction transversely to the corrugations that the filaments running parallel to the corrugations. In order to increase the spring force, several springs with the same wave pattern, or also several springs with opposite wave pattern may be arranged on top of each other. To facilitate the assembly and disassembly of the spring, it is advisable that the spring be arranged underneath the slot-closing wedge between a pressure member and a pressure trip situated on the bar.

It is further necessary to subdivide the springs lengthwise in the longitudinal direction of the slot, as each spring expands in length upon being pressed flat during installation. It is advantageous to make the slot-closing wedge and the spring situated underneath so that they both have the same axial length.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
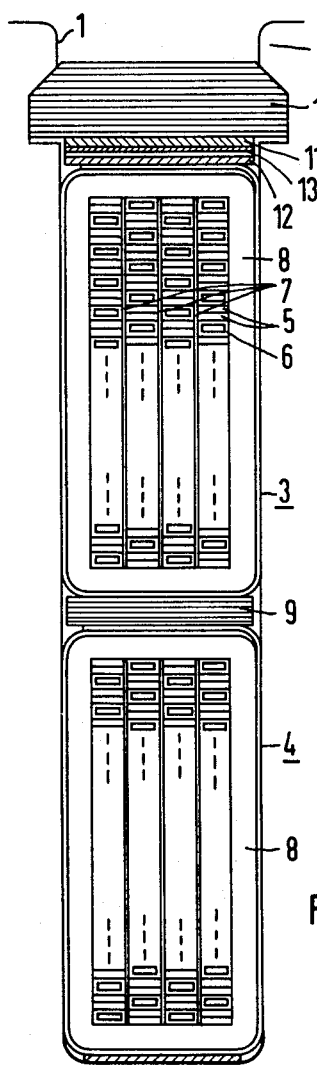
FIG. 1 is a cross sectional view through a slot in a stator and showing the leaf spring according to one embodiment of the invention.

Referring to the drawings, FIG. 1 shows two winding bars 3 and 4 arranged on top of each other in a slot 1 of a stack of laminations of a stator. The two bars 3 and 4 are of identical design and consist of transposed solid conductors 5 and corresponding hollow conductors 6 for cooling the winding. The individual conductor planes are separated here from each other by a layer of insulation 7 and are enclosed by an overall insulation 8. A spacer 9 is provided between the two bars 3 and 4. The slot 1 is closed off at its upper end by a slot-closing wedge 10 which is inserted into recesses of the slot flanks in dove-tail fashion as shown in FIG. 1.

Figure 2:
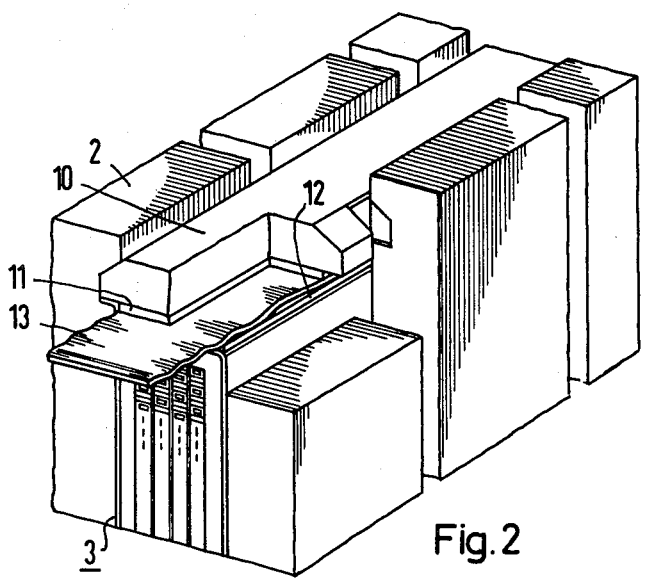
FIG. 2 is a partial perspective view of the slot, with parts broken away, showing the spring installed.

In order to brace the two bars 3 and 4 in the slot 1, a corrugated leaf spring 13 is arranged, in accordance with the present invention, underneath the slot-closing wedge 2 between a pressure member 11 and a pressure strip 12 disposed above the upper bar 3. The installation position of the leaf spring 13 can be seen particularly clearly in the perspective view of FIG. 2. This spring 13 has a spring characteristic which rises linearly to about 70% of the spring excursion or expanded state. This characteristic is achieved by providing a resin-impregnated, hardened and unidirectional glass-fiber cloth, in which the fiber strands are about 15 times heavier in the direction transversely to the corrugations than the fiber strands running parallel to the corrugations. Through the choice of a particular spring thickness the spring pressure of the spring can be matched to the bar pressure in each case in such a manner that the spring pressure is always higher, at least at the time of installation, than the bar pressure. This provides assurance that the bars in the slot are always subjected to a sufficient pretension, and detrimental effects due to loosening cannot occur. In the installation, the spring is compressed at least 80% of the spring excursion or expanded state and therefore lies nearly pressed flat in the slot as may also be seen clearly in FIG. 2. The springs 13 function so that they can expand and therefore be under less tension if a space occurs between the upper bar 3 and the slot-closing wedge 10, for instance due to flattening of the bar surfaces or due to thermal expansion. By pretensioning the spring 13 at least 80% of the entire spring excursion or expanded state, the drop in the pretension caused thereby is, therefore, so small that the bars remain sufficiently pretensioned. Unless the spring 13 are pressed completely flat, there remains, on the other hand, a small residual spring expansion of a few percent (about 10 to 20%), which in case of thermal expansion of the bar together with the other elasticity of the elements in the slot, prevents excessively high forces from being generated by an inhibited thermal expansion of the slot contents which leads to a flattening of the surface of the bars and insulating members in the slot, whereby the so-called settling is initiated or magnified.

Figure 3:
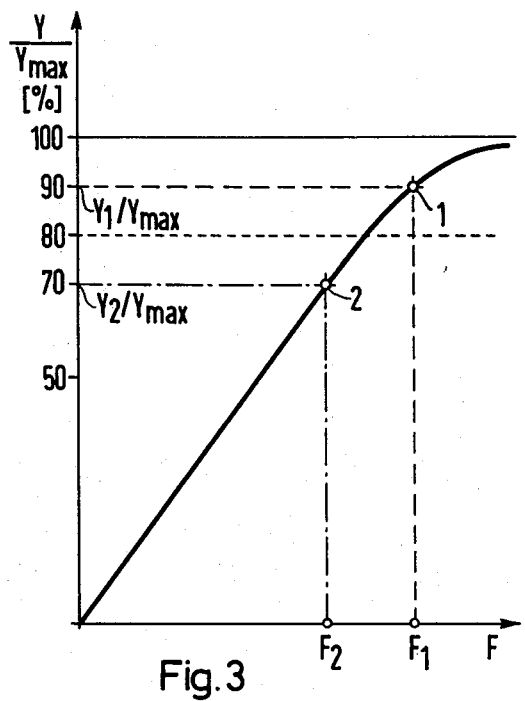
FIG. 3 is a diagram of a curve of the spring characteristics.

In the diagram shown in FIG. 3 the spring characteristic of a corrugated leaf spring is shown. In FIG. 3, the percentage of deformation $y/y_{max}$ is plotted against the spring force F. The spring is installed pretensioned so that the percent deformation is $y_1/y_{max} \geq 0.8$ to thereby produce a pretension force $F_1$ (point 1 of the curve in FIG. 3) which should be greater than the bar force. If in the course of operations, for instance, in the course of many years, an amount of settlement $\Delta y$ occurs in the slot contents, the spring expands by an amount equal to the value $y_2 = y_1 - \Delta y$ and thereby produces a different tension force $F_2$, which under conditions of the design criteria mentioned, is sufficient to prevent the bar from being lifted from the bottom of the slot and therefore from banging. The amount of settlement $\Delta y$ has many causes and can be determined statistically on the basis of data obtained from experience and may include; abrasion of the slot-closing wedges at the support flanks, plastic deformation of the bar surfaces and insulating filler parts in the slot, or permanent deformation or shrinking of the parts within the slot.

In the example of the illustrated embodiment, only one spring 13 is shown underneath the slot-closing wedge 10. However, it is also possible to arrange several springs in parallel disposition or mutually displaced on top of each other so that the spring force is thereby further increased. In addition, the slot-closing wedge and the spring may be built in directly on top of each other.

With an appropriately pretensioned spring as described above sufficient pretensioning of the bars in the slot is therefore always assured during operation and re-tightening of the spring is not necessary.

I claim:

1. Method for securing a winding bar in a slot of an electric machine, said slot being adapted to receive a wedge comprising the steps of: inserting a corrugated spring in said slot on top of said bar, said spring extending in the longitudinal direction of the slot, inserting a pressure member on top of said spring, and applying tensioning force to said spring, solely by inserting a wedge into said slot in said longitudinal direction, said spring having a spring characteristic which is linear up to 70% of the maximum expanded state of the spring, said spring being compressed solely through the insertion of the slot closing wedge to at least 80% of its expanded state.

* * * * *